United States Patent
Nagasu et al.

(10) Patent No.: US 6,600,978 B2
(45) Date of Patent: Jul. 29, 2003

(54) RAILWAY VEHICLE OPERATION-CONTROL SYSTEM AND A RAILWAY VEHICLE USING THE OPERATION CONTROL SYSTEM

(75) Inventors: Masahiro Nagasu, Hitachinaka (JP); Yutaka Sato, Hitachi (JP); Shin Kimura, Asahikawa (JP); Kiyoshi Nakata, Iwase (JP)

(73) Assignee: Hitachi, Ltd., Tokyo (JP)

( * ) Notice: Subject to any disclaimer, the term of this patent is extended or adjusted under 35 U.S.C. 154(b) by 42 days.

(21) Appl. No.: 10/013,520

(22) Filed: Dec. 13, 2001

(65) Prior Publication Data

US 2002/0161490 A1 Oct. 31, 2002

(30) Foreign Application Priority Data

Apr. 24, 2001 (JP) .......................... 2001-127924

(51) Int. Cl.$^7$ .............................. G06F 17/00; B61L 3/00
(52) U.S. Cl. ..................... 701/19; 701/208; 246/169 R; 246/182 AA; 104/295
(58) Field of Search .............................. 701/19, 20, 33, 701/29, 208, 217; 246/169 R, 182 R, 182 AA, 187 R; 104/288, 295; 713/320, 324, 330, 340

(56) References Cited

U.S. PATENT DOCUMENTS 5,293,632 A   3/1994   Novakovich et al. ....... 713/324
6,225,919 B1 *  5/2001   Lumbis et al. .............. 340/933

FOREIGN PATENT DOCUMENTS

EP   0755840   1/1997
WO   99/14093  3/1999

OTHER PUBLICATIONS

Search Report.

* cited by examiner

*Primary Examiner*—Tan Q. Nguyen
(74) *Attorney, Agent, or Firm*—Crowell & Moring LLP (57) ABSTRACT

A railway vehicle operation-control system includes at least one central processing unit being connected to a plurality of devices, which are connected in parallel, via information communication means, the plurality of the devices having at least one operational state-monitoring function which transmits information on operational states of each device to the central processing unit; wherein a total controlled-variable necessary for the system is attained by allocating the total control variable to each device based on operational states determined from results of monitoring performed by the operational state-monitoring function, and a performance margin which is defined as a difference between a permissible power-output value and a current power-output value for each device while monitoring and reflecting the performance margin of each device.

23 Claims, 11 Drawing Sheets

RAILWAY VEHICLE OPERATION-CONTROL SYSTEM AND A RAILWAY VEHICLE USING THE OPERATION CONTROL SYSTEM

BACKGROUND OF THE INVENTION

The present invention relates to a railway vehicle operation-control system and a railway vehicle using the operation-control system so as to achieve a target operation by using a plurality of drive devices.

A railway vehicle and an airplane runs or aviates by operating a plurality of power-driven apparatuses which are connected in parallel. For example, a railway vehicle is composes of several or over ten rolling stocks. Each rolling stone usually includes 3 or 4 inverter drive-apparatuses. Further, about 2–4 motors are connected to each inverter drive apparatus in parallel. Also, each inverter drive-apparatus receives a torque-output instruction sent from an operation unit provided at the top rolling stock, and is controlled so that an actual torque-output is equal to the instructed torque-output, by controlling each motor current.

Conventionally, the running of a railway vehicle is performed as follows. A torque-output instruction is allocated to each inverter drive-apparatus from the operation unit, and several kinds of artifices are applied to the allocating of the required torque-output to each inverter drive-apparatus. A railway vehicle runs on a railway made of iron, using wheels made of iron, while being accelerated or decelerated. Since the friction coefficient is small, an iron wheel tends to cause idle running. Also, since the friction coefficient of iron changes depending on surface states of a railway and wheels, the friction coefficient is affected by wet or rusty sates of the railway and the wheel.

The top rolling stock particularly tend to receive effects of the surface states of the railway, which in turn easily causes idle running. Accordingly, the torque generated by the top rolling stock is set to 80–90% of the torque of the consecutive rolling stocks. Further, the friction force is proportional to the load applied to a contact face between a wheel and a railway.

Therefore, for a rolling stock in which there are a small number of people, a way for preventing idle running by reducing the torque of this rolling stock is performed. Even if a trouble of idle running occurs, each drive device is controlled so that the idle running of each drive device is prevented by reducing its torque, and the torque of each drive device is gradually returned to its predetermined torque.

Further, an inverter is heated by a current conduction loss when current flows in the inverter, and a switching loss when current switching is operated. If the temperature of an inverter element increases to more than a design value, the element breaks down by heat. Therefore, the increasing values of switching elements are estimated based on a running pattern of a rout on which the railway vehicle is to run, and the temperature characteristics of the switching elements. By using the results of the estimation, the electric characteristics of the switching elements and the cooling performance of cooling devices to be used are designed so that the switching elements does not break down even at the worst case. The worst case is that wind does not absolutely pass around the cooling devices, or that the number of riding people is more than a limit value.

A car is a system driven by a method similar to that of a railway vehicle. In a car, a torque-output fed from one power source is optimally distributed to each wheel by a mechanical power distribution apparatus while being adaptive to surface states of the road, in order to improve the operational performance.

SUMMARY OF THE INVENTION

The present invention aims at a system in which a plurality of power sources are connected in parallel. Accordingly, the present invention does not aim at a system, such as a car, in which there is one power source, and which is well driven by adjusting transmission coefficients of a transmission device for transmitting drive force from the one power source to wheels.

A conventional railway vehicle system is designed so that a break down trouble does not occur even at the worst case, assuming the worst case determined based on actually measured or experienced data. Further, even if any trouble occur, each problem device is separately treated. However, if each problem device in a system is independently treated, there are several problems in a such conventional system.

For example, in an idle running, the following problem will occur. At first, The torque to the idle-running wheel is reduced, in order to stop the idle running, and the torque to the wheel is returned to the predetermined torque after the idle running has stopped.

However, since each device is separately treated, if an idle running occur, the acceleration ability of the whole railway vehicle is deteriorated.

Further, in a heating problem of an inverter, the following problem may occur. In a recent inverter, a switching element is made of semiconductor. Since a heating loss of a semiconductor switching element increases as its temperature become higher, it is desirable to use a semiconductor switching element at a low temperature. In A large system such as a railway vehicle whose length is about 300 m, the temperature of each inverter is different due to its environmental conditions such as natural window, raining, etc. If each device is operated at the same allocated torque instruction (not controlled), the inverters, whose temperature are high, cause a large quantity of loss, and their temperature more increase, which in turn degrades the energy conversion efficiency of the inverters.

An objective of the present invention is to prevent the degradation of a large system such as a railway vehicle.

Another object of the present invention is to maximize the energy conversion efficiency by minimizing the loss of the inverters.

To achieve the above objectives, a railway vehicle of the present invention includes; at lest one monitoring unit, provided at devices, which performs a monitoring function for monitoring an operational state of each device; a communication network; a central processing unit for optimally distributing control information to each device.

The monitoring units acquire information on operational states of the respective devices, and sends the information to the central processing unit via the communication network. The central processing unit calculates a difference between a permissible level of a state variable such as torque, temperature, etc., and a current level of the corresponding state variable, for each device, and allocates a controlled-variable to each device so that each difference is larger than a predetermined permissible value. Further, if the current controlled-variable level (power-output) of some device exceeds its predetermined permissible level, the controlled-variable of this device is reduced, the amount of reduced controlled-variable is distributed to the rest devices. The controlled-variables of the rest devices are adjusted, and are allocated to respective devices via the communication network. That is, the rest devices are controlled based on the controlled-variables redistributed by the central process unit. Here, a permissible value (level) of each device is determined by using data measured in advance, or can be changed based on the monitoring results of the monitoring device for each device.

If an idle running trouble occurs, the control processing of this trouble is explained as follows. The state of torque of each inverter, and the state of each idle-running place, are periodically transmitted to the central processing unit via the communication network. When the central processing unit receives the information on occurrence of the idle running trouble from some monitoring device, the central processing unit immediately reduces the torque of the problem inverter related with the idle running trouble, and sends the instructions of reallocation of the reduced torque to the rest inverters. In this allocation, the reduced torque is allocated so that each allocated torque is less than the maximal torque value at which an idle running occurs at each device. Each maximal torque value causing an idle running is a predetermined value which was predetermined by actual measurement data in advance, but this maximal torque value is adjusted by taking the railway conditions of "new or old", the surrounding environment such as climate, the total weight of each rolling stock, etc., into account, and it is possible to flexibly adjust each maximal torque, and to more appropriately determine the reallocation to the rest inverters. In some situation of occurrence of an idle running, it is also possible to change the maximal torque of each wheel in turn.

The control processing for the inverter temperature is explained as follows. The temperature of a semiconductor switching element of each inverter is sequentially measured, and the measured temperature value is transmitted to the central processing unit via the communication network. The central processing unit reduces the current flowing in the inverter of the high temperature so as to reduce the torque generated by this inverter, and reallocates the reduced torque of the devices connected to the rest inverters so that the temperature of the inverters is almost equal. If the above reallocation of the reduced torque in the rest inverter is not impossible for a predicted necessary acceleration performance, the drive conditions of the semiconductor switching elements are changed so that the loss of the switching is reduced. If such drive conditions cannot be found, the acceleration level of the railway vehicle is decreased.

Thus, in the present invention, a permissible value is always compared with a current controlled-variable (power-output) of each device, and the difference between the permissible value and the current power-output, which is defined as a performance margin, in this specification.

DETAILED DESCRIPTION OF THE EMBODIMENTS

Figure 1A:
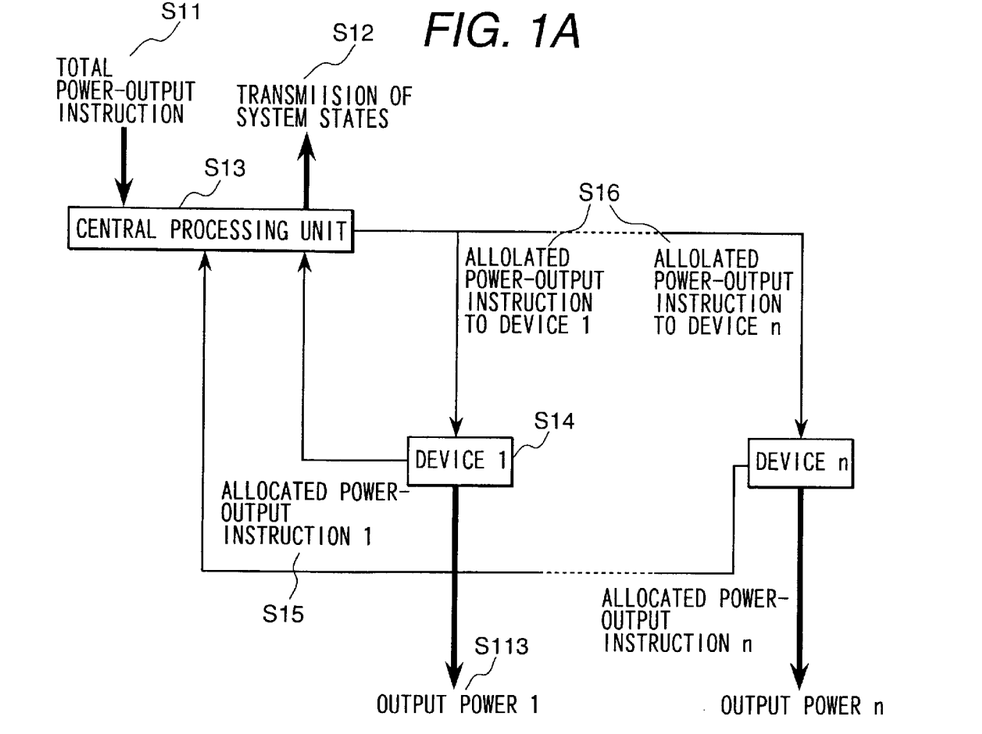
FIG. 1A is a schematic block diagram showing the composition of an operation-control system of an embodiment according to the present invention.
Figure 1B:
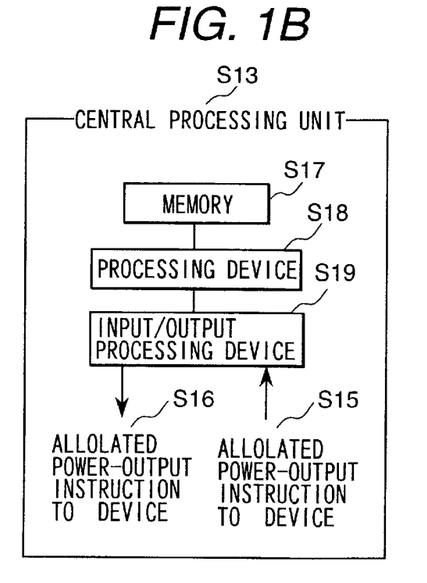
FIG. 1B is a schematic block diagram showing the composition of the central processing unit shown FIG. 1A
Figure 1C:
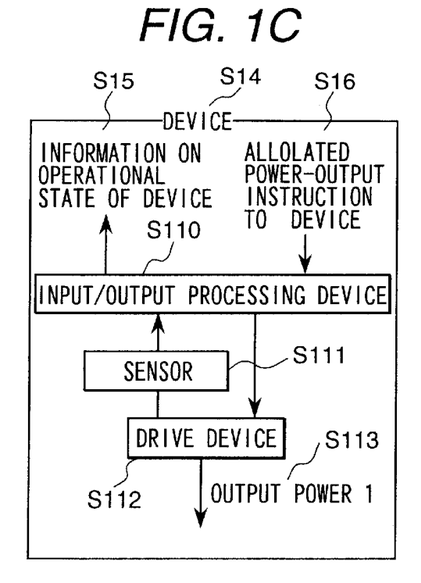
FIG. 1c is a schematic block diagram showing the composition of the central processing unit shown FIG. 1A
Figure 2:
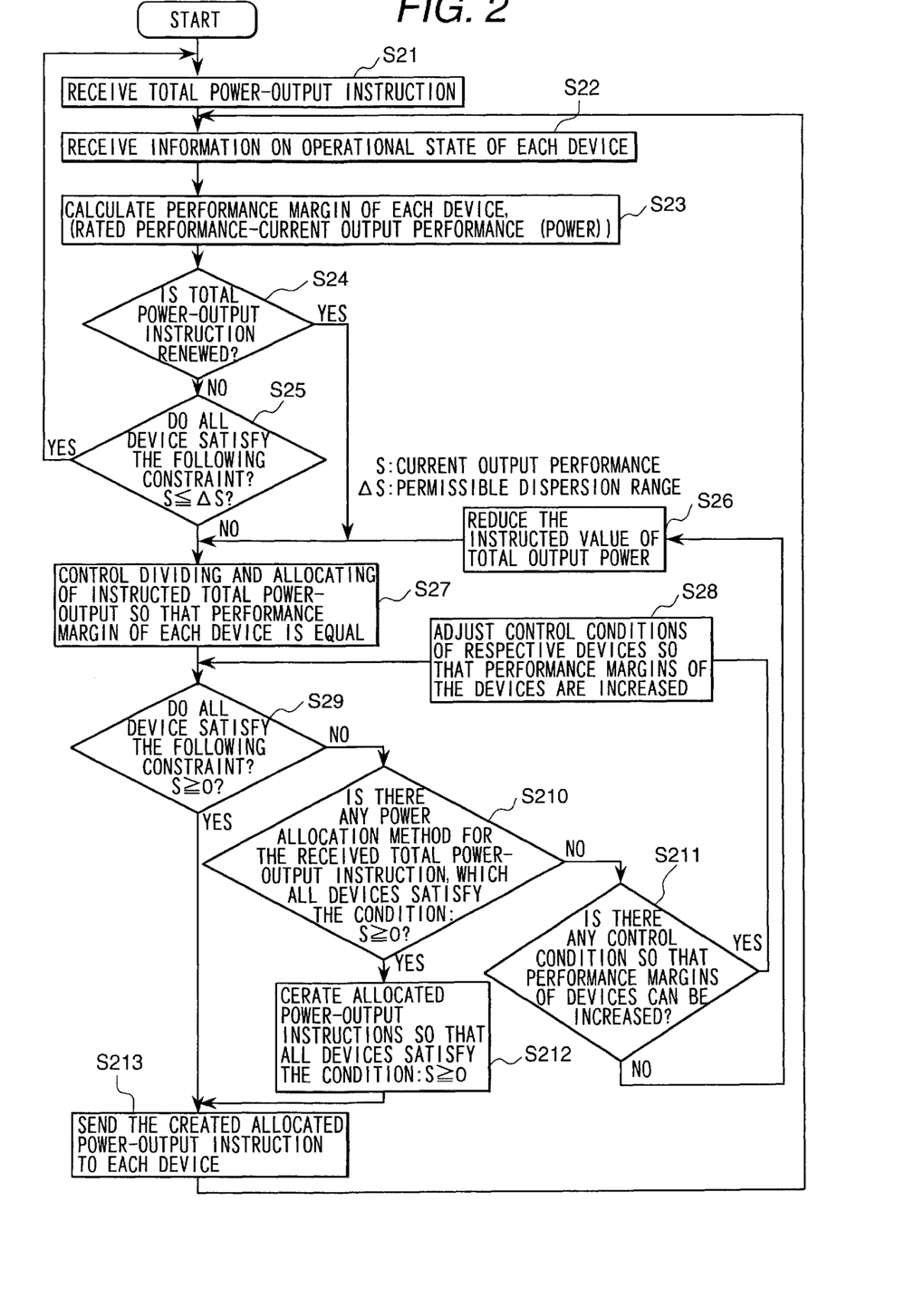
FIG. 2 is a flow chart of control processes executed by the operation-control system shown FIG. 1A.
Figure 5:
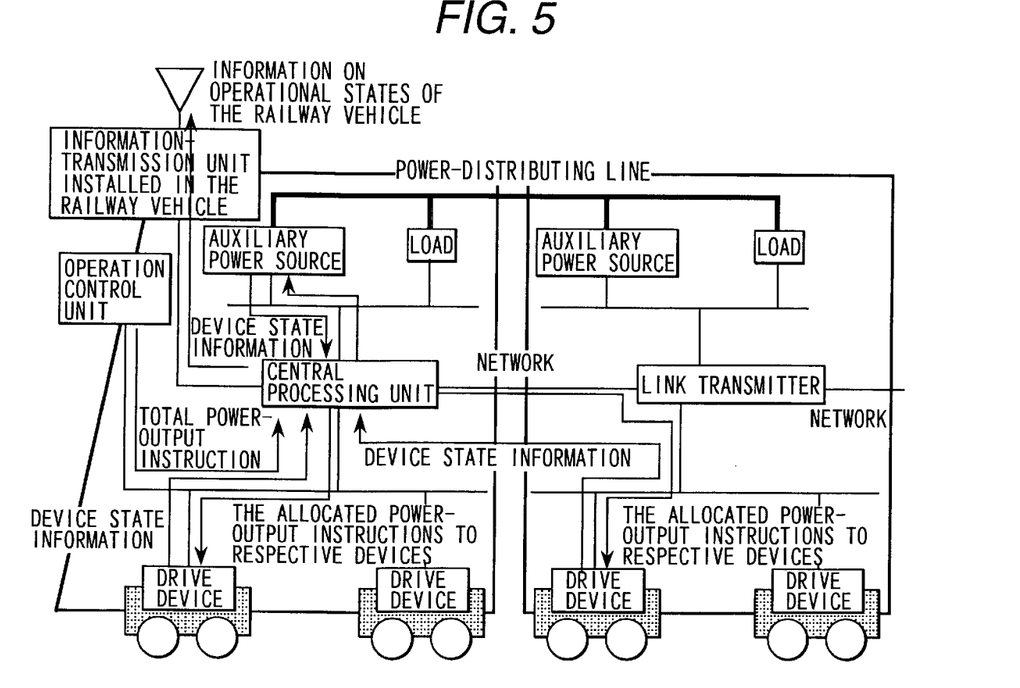
FIG. 5 is an illustration showing the composition of a railway vehicle to which the operation-control system shown in FIG. 1A is applied, of another embodiment according to the present invention.

FIGS. 1A–1c show the composition of each main apparatus in an operation-control system which is applied to a railway vehicle shown in FIG. 5. FIG. 2 is a flow chart of control processes executed by the operation-control system. The operation-control system includes at least one central processing unit S13, and two or more devices S14.

As shown FIG. 1B, the central processing unit S13 includes a memory S17, a processing device S18, and an input/output processing device S19. Also, as shown FIG. 1B, each device S14 includes an input/output processing device S110, a sensor S111, and a drive device S112. The sensor S111 is attached to each device S14, for sensing an operational state, and detects the operational state of the device S14. The information S15 on the detected operational state passes through the input/output processing device S15, and is sent to the central processing unit S13 via a transmission line such as a communication net work.

The central processing unit S13 receives the information on the operational state of each device, and executes necessary processing by using the received information. Further, it sends an allocated power-output instruction S16 to each device. When the central processing unit S13 has received a total power-output instruction s11, it executes the processing of dividing and allocating a total power-output necessary for this total system to the respective devices, it allocates the total power-output to each device based on the information S15 on the operational state of each device.

By using the flow chart shown in FIG. 2, the processing of allocating the instructed total power-output, which is executed by the central processing unit 13, is explained below in more detail.

In steps S21 and S25, the total power-output instruction S11 and the information S15 on the operational state of the device are input to the central processing unit S13. In step S23, a difference between a permissible value (level) and a current state variable (usually power-output) of each device is calculated. This difference is defined as a performance margin S. In step S24, it is determined whether or not the instructed total power-output is renewed. If the renewal of the total power-output is not instructed, in step S25, the dispersion in all performance margins S values is obtained, and it is determined whether or not each performance margin S is within a permissible range ΔS of dispersion in the performance margins S (hereafter simply referred to as a permissible dispersion range ΔS). If all the performance margins S is in the permissible dispersion range ΔS, the control processing return to step S21. Meanwhile, S≦ΔS means, for example, $(S_{max}-S_{min}) \leq \Delta S$, for all performance margins S, where $S_{max}$ and $S_{min}$ represent the present maximal and minimal values in the performance margins s of all the devices, respectively.

In step S24, if the renewal of the total power-output is instructed, and in step 25, it is determined all performance margins S is not within a permissible dispersion range ΔS, in step S27, in response to the renewed instruction S11, the renewed total power-output is allocated so that the performance margins S of all the devices are equal, and new allocated power-output instructions are sent to all the devices. Further, in step S29, the performance margin S of all the devices are checked whether or not the S values of all the device are positive. If the S values of all the device are positive, in step 213, the determined allocated power-output instructions S16 are sent to the respective devices, and the control processing returns to step 21.

In step S29, if the S values of all the device are not positive, in step 210, the power-output allocation way such as that which realizes that all the S value are positive is searched. If there is power-output allocation way such as that which realizes that all the S value are positive, in step S212, the power-output allocation is implemented by using the searched allocation conditions, and the adjusted allocated power-output instruction is sent to each device in step S213. Conversely, if there is not power-output allocation conditions such as those which realize that all the S values are positive, in step 211, the control conditions such as those which realize that the problem S values can be increased, are further searched. If control conditions such as those which realize that the problem S values can be increased, are found, in step S28, the performance margins S of the problem devices are increased by using the found control conditions, and the control processing returns to the step S29. Conversely, if control conditions such as those which realize that the problem s values can be increased, are not found, in step S26, the total power-output is decreased, and the control processing goes to step S27.

Effects obtained by the above-described processing are explained below in more detail. In the present invention, the operation-control system controls a railway vehicle divides and allocates the total controlled-variable (power-output) necessary for a railway vehicle system based on the state variable (output performance, etc.) and the performance margin S of each device, which is defined as a difference between a permissible value and a current output performance (power-output), so that all the performance margin S are in a permissible dispersion range ΔS, and all the state variables does not exceed there respective permissible values. For example, if the above control method is applied to the temperature control of each inverter, the following effects can be obtained. The permissible temperature of semiconductor elements used in an inverter is 125° C., and it is prescribed that they are use at the temperature less than 125° C.

In the inverters used in the railway vehicle, the permissible temperature value of semiconductors is set to 125° C. A system such as an electrical train whose length is about 300 m, usually includes 3 or 4 inverters. These inverters are almost cooled by natural wind, and their cooling efficiencies are largely affected by the strength of natural wind, and by structural environment outside the running electrical train. Therefore, even if the control instructions to the respective inverter so as to output the same power, all the inverters does not operate at the same temperature. Since the loss of each inverter increases as its temperature increases, if all the inverters are controlled so as to output the same power, despite differences of the temperature in the respective inverters, the total loss of the system becomes larger. Moreover, if the inverters are not cooled by natural wind, the temperature of the inverters increase, and they may break down.

On the other hand, in the present invention, a difference between a permissible value of each inverter and its current temperature value is kept within a predetermined range. Accordingly, the temperature values of all the inverters are equalized, the loss caused by the inverters can be reduced. Moreover, since the temperature of all the inverters are controlled so as not to exceed the permissible temperature 125° C., the inverters do not break down.

Figure 3:
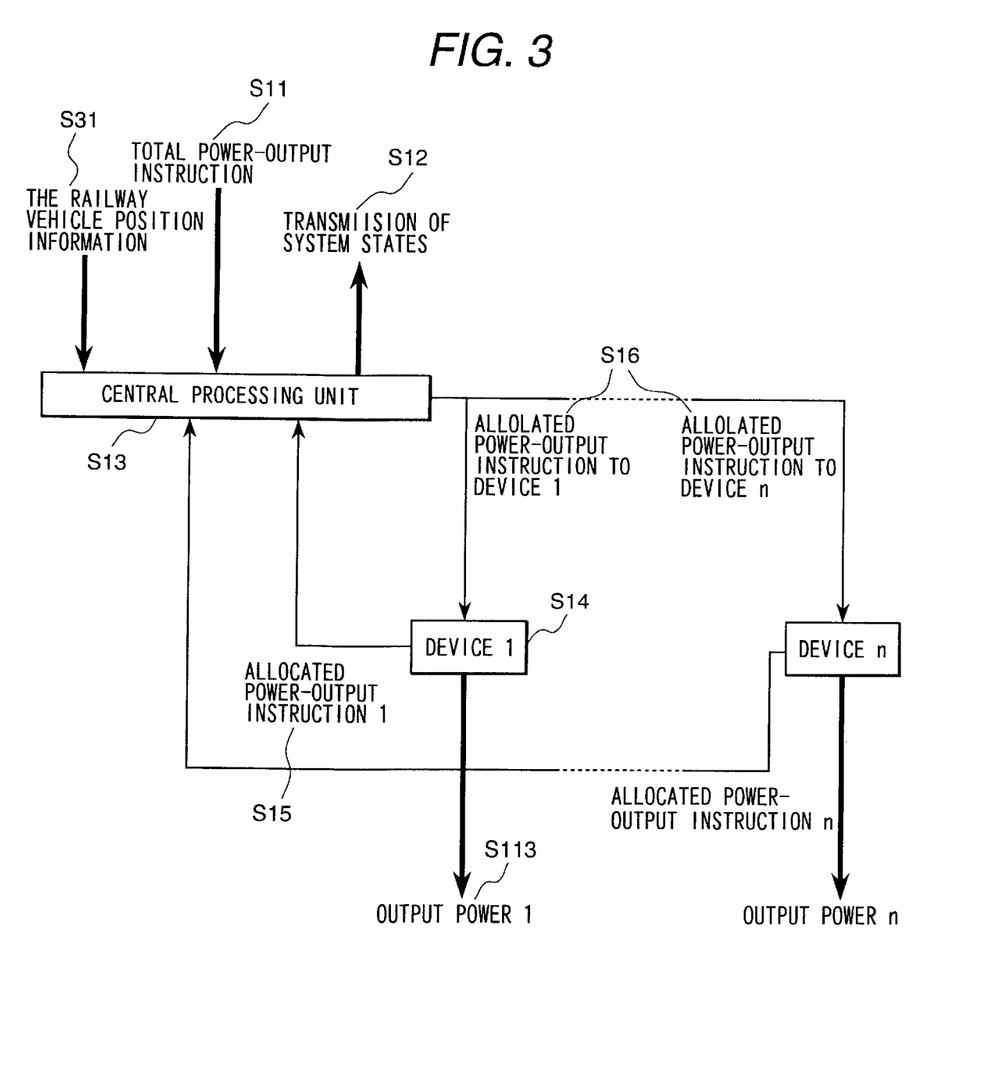
FIG. 3 is a schematic block diagram showing the composition of an operation-control system having a position information-monitoring function in another embodiment according to the present information.
Figure 4:
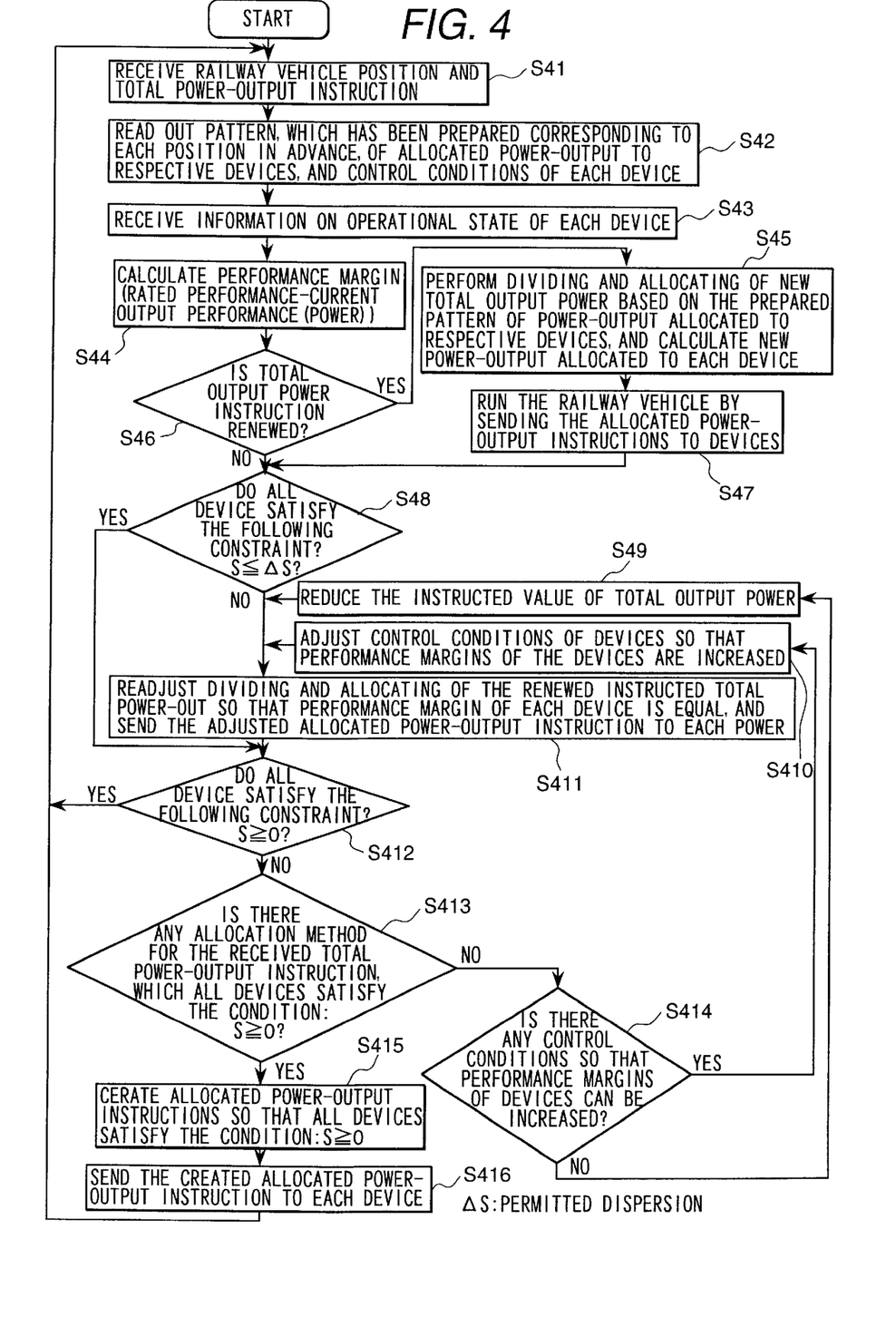
FIG. 4 is a flow chart of control processes executed by the operation-control system shown FIG. 3.

FIG. 3 and FIG. 4 shows an operation-control system of another embodiment according to the present invention, in which current position information of the railway vehicle is detected and used. A different point from the operation-control system shown in FIG. 1 is only in that information input S31 on the current position of the railway vehicle is input to the central processing unit S13. As described above, countermeasures to a brake down of any inverter are prepared. However, if some one of the inverters should break down or receive a severe damage, and the operation of this inverter cannot be continued, the operation of this inverter is stopped, and the controlled-variable (power-output) which this inverter has had charge of, is allocated to the rest inverters. This changed allocations are adjusted so that the performance margin S of each device is in the permissible dispersion range ΔS. The operation of the system using the position information is explained below in detail with reference to the flow chart shown in FIG. 4.

At first, in step S41, the total power instruction and the information on the position of the railway vehicle are received by the central processing unit S13. Next, in step S42, a pattern of the allocated power-output instructions for the respective devices, which has been prepared and stored in advance, is read out. Further, in step S43, the information on operational state of each device is received, and in step S44, the performance margin S of each device is calculated.

Further, in step S46, it is determined whether or not the instruction of the total output power is renewed. If the instruction of the total output power is renewed, in step S45, the instructed new total output power is divided and allocated to each device based on the prepared and stored power-output allocation pattern, and in step S47, the operation-control system runs the railway vehicle by sending the instruction of the calculated output power allocated to each device. Then, the control processing goes to step S48 in which it is determined whether or not the performance margins S of all the devices are in the permissible dispersion range ΔS. In step S46, If the instruction of the total output power is not renewed, the steps 45 and 47 are skipped, and the control processing goes to step S48.

In step S48, if it is determined that the performance margins S of all the devices are in the permissible dispersion range ΔS, further, in step S412, it is determined that all the performances S are positive. Conversely, in step S48, it is found that the performance margins of some devices are out of the permissible dispersion range ΔS, in step S411, the dividing and allocating of the renewed instructed total output power is readjusted so that the performance margins of all the device are equal, and the readjusted allocated power-output instruction is sent to each device. Further, the controlling processing goes to step S412, In step S412, if all the performance margins S are positive, the controlling processing returns to the first step S41, otherwise, in step S413, it is determined whether or not there is any allocation way, for the received total output power instruction, which all devices satisfy the condition: $S \geq 0$.

In step S413, if there is any way to achieve the above problem, step 415 in which new allocated power-output instructions such as that which all devices satisfy the condition: $S \geq 0$, are created. Further, in step S416, the new allocated power-output instruction is sent to each device. Then, the controlling processing returns to the first step S41.

In step S413, if it is determined that there is not any allocation way, for the received total output power instruction, which all devices satisfy the condition: $S \geq 0$, further, in step S414, it is determined whether or not there is any control conditions such as those which the performance margins of the problem devices S can be increases. If there are some control conditions to achieve the above objective, in step S410, the found control conditions are applied to the problem devices, and the control processing goes to step S411. If there are not any control conditions to achieve the above objective, in step S49, the total output power is reduced, and the control processing goes to step S411.

The using of the railway vehicle position information brings the following advantage. In the operation of the railway, the rout of its running is determined in advance, the controlled-variable of each device in the running operation for the route is known in advance. Therefore, the tendency of changes in the performance margin S of each device, is almost equal to the performance dispersion rang ΔS, for the route, every running operations.

Accordingly, for a standard running operation pattern, a set of patterns of allocated power-output instructions for the respective devices, corresponding to each changes in the total power output instruction, are prepared and stored. In the above set, any one of the performance margins S is in the permissible dispersion of S, and is positive. When the running operation of the railway vehicle is performed by using the above prepared set of the allocated power-set instructions, the number of the renewal of dividing an allocating the total output power, can be reduced.

Figure 14:
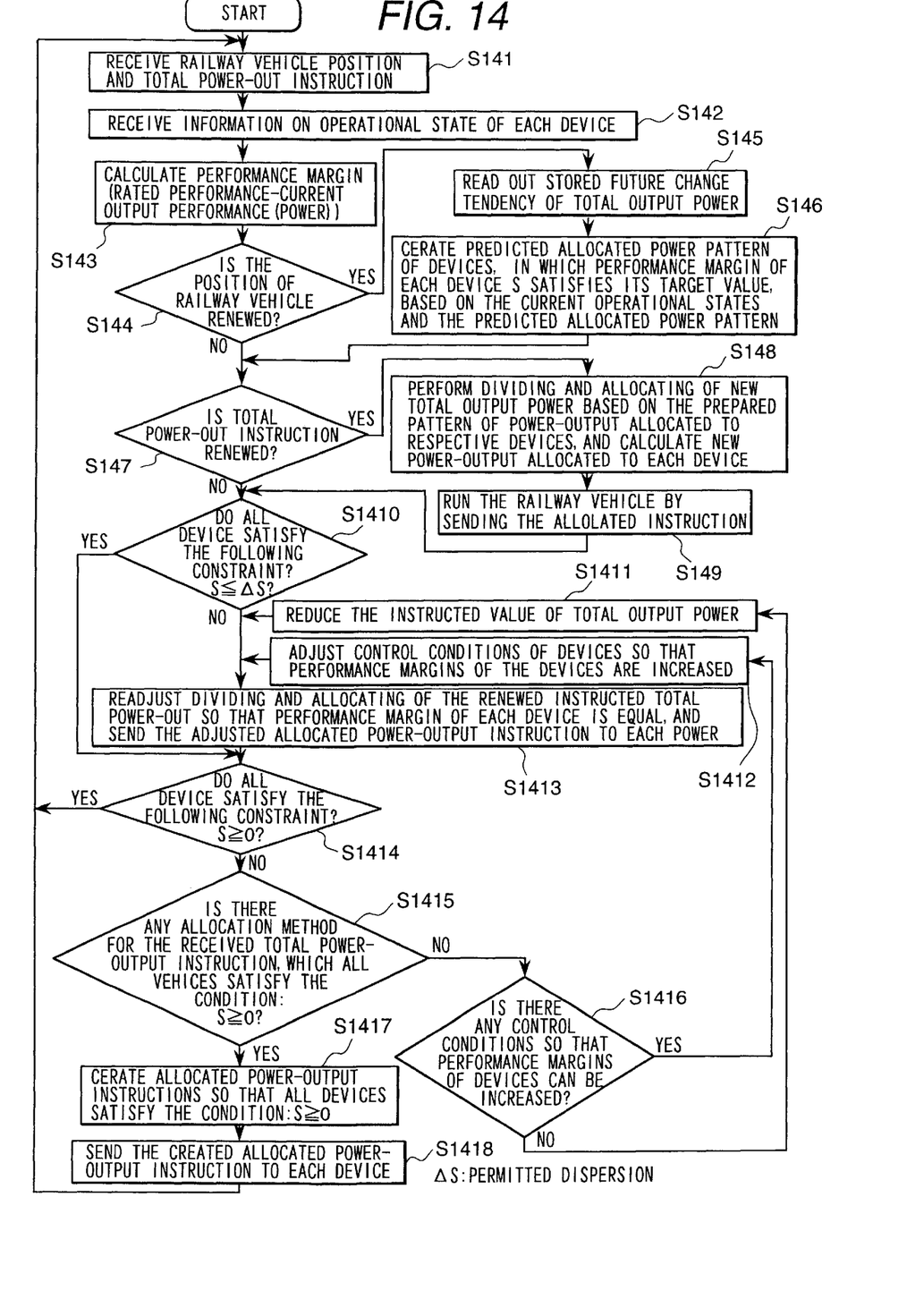
FIG. 14 is a flowchart of control processes differently from those shown in FIG. 4, which is executed also by the operation-control system shown FIG. 3.

FIG. 14 show a system control of further another embodiment according to the present invention, in which position information of the railway vehicle is detected and used.

In step S141, the railway vehicle position and the total output power instruction are received, and in step S142, the operational state variables of each device are acquired. Further, in step S143, the performance margin S of each device is calculated. Next, in step 144, it is determined whether or not the information on the position is changed. If the position is changed, in step 145, a series of the total output power instructions corresponding to the tendency of future changes in the total output power, is read out.

Further, in step S147, a predicted allocated power-output instruction pattern for the respective devices, by which a performance margin S of each device satisfies its target value, is created. Further, the control processing goes to step S147 in which it is determined whether or not the total power output instruction is renewed. In step S144, if it is determined that the information on the position is not changed, the steps 145 and 146 are not executed, and the control processing goes to step S147. In step S147, if it is determined that the total power output instruction is renewed, the control processing goes to step S148 in which the predicted allocated power pattern for the renewed total power instruction, and the calculated allocated power-out instructions, which are obtained in step 146, is adjusted. Furthermore, in step 149, the new calculated power-output instructions are sent to the respective device. Then, the controlling processing goes to step S1410 in which all the performance margins are within the permissible dispersion range.

In step S147, if it is determined that the total power output instruction is not renewed, the control processing goes to step S1410. In step S1410, if all the performance margins s are within the permissible dispersion range (ΔS), the control processing goes to step S1414 in which it is determined whether or not all the performance margins s is positive.

In step S1410, if some performance margins do not are out of the permissible dispersion range ΔS, in step 1413, the dividing and allocating of the renewed instructed total power output is readjusted so that the performance margins S of all the devices are equal, and the control processing goes to step S1414 in which it is determined whether or not all the performance margins S are positive. In step S1414, all S are positive, the control processing returns to the first step S141. If S of some devices are negative, in step S1415, it is searched that there is any allocation way, for the received total power output instruction, which makes all devices satisfy the condition: $S \geq 0$.

In step S1415, if there is any way to achieve the above objective, new allocated power-output instructions such as that which all devices satisfy the condition: $S \geq 0$, and the new allocated power-output instructions are sent to the respective devices. Then, the control processing returns to step S141. Conversely, if there is not any way to achieve the above objective, it is searched whether or not there are any control conditions such as those which the performance margins of the devices can be increased.

In step S1416, if there are any control conditions to achieve the above objective, control conditions of the devices are adjusted so that the performance margins S are increased, and the control processing returns to step S1413. Conversely, if there are not any control conditions to achieve the above objective, instep S1411, after the instructed value of the total power output is reduced, the control processing returns to step S1413.

In the control shown by the flow chart in FIG. 14, the new control method is incorporated, That is, since the trend of the future total power-output instruction is estimated based on the current position of the railway vehicle, and the optimally adjusted allocated power-output instructions for attaining the target run of the railway vehicle can be created, and are sent to the respective devices. Although the route on which the railway vehicle runs is determined, and the controlled-variables of each device is almost known in advance, since each device receives effects of its surrounding environment of the railway vehicle, the controlled-variables of each device is not always the same every run even on the same rout.

Accordingly, if allocated power-output instructions corresponding to changes of the total power-output instruction, which are obtained in advance assuming the standard running pattern, and the railway vehicle is run without adjusting the predetermined allocated power-output instructions, the performance margins S of the devices frequently deviate from their target values. Thus, since this embodiment includes the processing which predictd and correctd a future running pattern based on information on current operational state of each device, the processing load for the dividing and allocating of the total power-output instruction can be remarkably reduced. By above control method such that shown in FIG. 14, the following application is possible. That is, a standard allocate controlled-variable pattern for a running interval from the detected current position to the next stop position is read out from the memory, and the standard allocate controlled-variable pattern for the respective devices is adjusted in advance by considering the present running environment and assumed changes of a performance margin S of each device. Thus, a controlled-variable of each device is controlled to achieve the objective of running for the interval by using this adjusted allocated controlled-variable pattern.

FIG. 5 showing the composition of a railway vehicle to which the above-described operation-control system according to the present invention. The central processing unit and link transmitters are connected to a network, and a plurality of networks are connected to each device. The arrangement of networks are not restricted to that shown in FIG. 5. it is possible that all devices are connected to one network. Further, an auxiliary power source, loads, drive devices, etc., can be connected to each net work. Furthermore, the operation-control unit used by an operator is also connected to the network.

Also, a running information-communication unit for transmitting the running states of the railway vehicle to the related stations, a railway vehicle run management apparatus, etc., is also installed and connected to the network. The central processing unit receives the total power-output instruction from the operation control unit, and information on operational states of the respective drive devices, the loads, etc. Conversely, the central processing unit sends allocated power-output instructions, which have been created based on the total power-output instruction and the information on operational state of each device, to the respective devices. By installing a running-state information-transmission unit in the railway vehicle, it is possible to transmit the operational and control states to external facilities. The transmitted information on the operational and control states of the railway vehicle can be used by a run management system, a railway maintenance system, etc.

Each drive device is controlled as follows. The central processing unit calculates a difference a current performance (power-output) of each device and the permissible performance value, which is defined as a performance margin S of the device. Next, the total power-output instructed by the operation control unit is allocated by taking the magnitude of the performance margin of each device into account, and the allocated power-output instructions are sent to the respective device. Therefore, a large dispersion of the performance margins S and a negative performance margin S can be prevented. For example, concerning the controlling of the device temperature, it is possible to make the temperature of the devices equal, and to prevent a device from breaking down due to exceeding its permissible temperature value.

Figure 6:
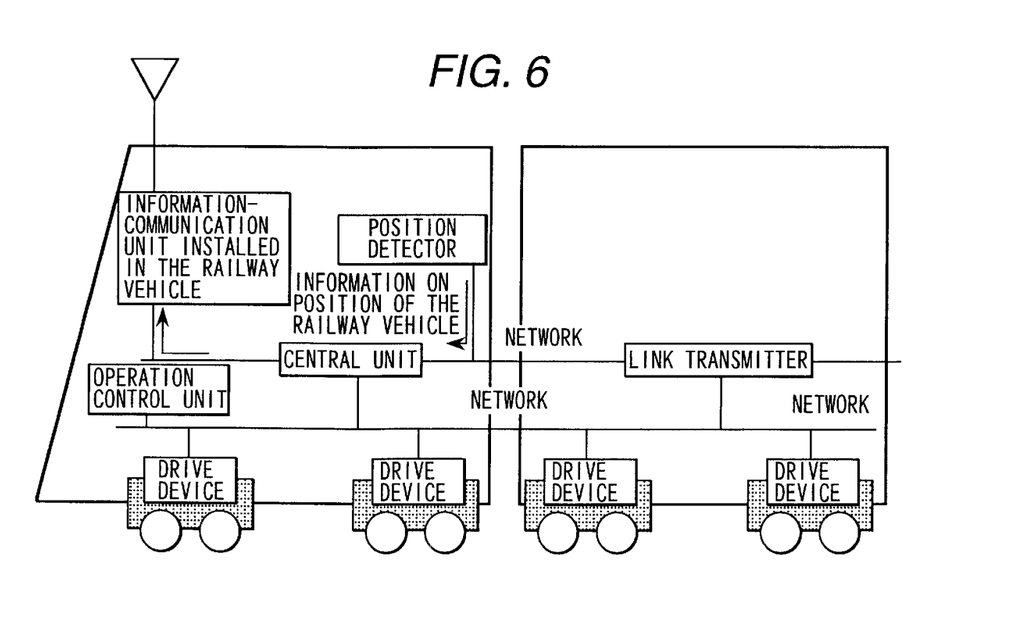
FIG. 6 is an illustration showing the composition of a railway vehicle to which the operation-control system shown in FIG. 3 is applied, of another embodiment according to the present invention.

FIG. 6 shows the composition of the railway vehicle in which the position detector is installed. Meanwhile, for simplicity, the composition is schematically illustrated. The central processing unit receives the information on the current position of the railway vehicle, the total power-output instruction, and the information on the operational states of the devices, via the networks. In the operation of the railway vehicle, since the railway vehicle runs on the fixed route, approximate changes of the performance margin S of each device can be estimated. Therefore, by using the allocated power-output instructions corresponding to each total power-output instruction, which are prepared and stored in advance, as the initial allocated power-output instruction pattern, the number of adjusting the performance margin S to be within a target range can be reduces, which in turn can achieve a high-speed control.

Figure 7:
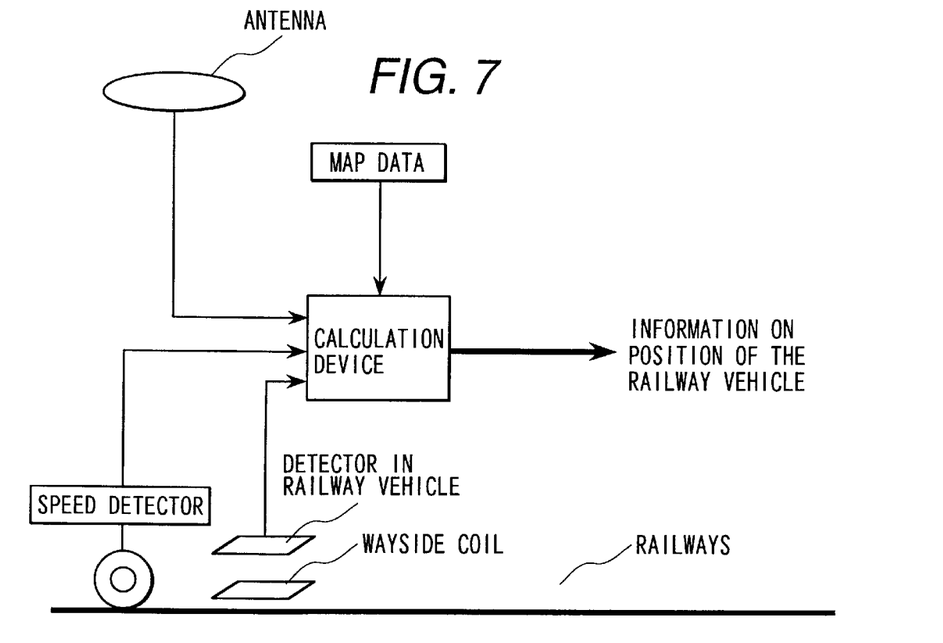
FIG. 7 is an illustration showing the composition of a position-detection apparatus.

FIG. 7 shows the more detailed composition of the railway vehicle in which the position-detection apparatus is installed in more detail than that shown in FIG. 6. An antenna, a speed detector, a position detection apparatus, etc. are connected to the central processing unit. As the antenna, for example, a GPS (Global Positioning System) antenna which are widely used for cars. Further, by correcting the information on the position of the railway vehicle, obtained by the antenna, using the information obtained by the speed detector, the detecting of the more accurate position becomes possible. Also, an electric car runs on a fixed rail route. Accordingly, the following position detection method is possible. That is, wayside coils are provided along the rail. A receiver for receiving a signal output from each way coil, which is installed in the electric train, receives the signal from each wayside coil, and the information on the position of the electrical train can be obtained. Although the above position detectors can be separately used, by determining the current position by comprehensively using position information sent from the plurality position detectors.

Figure 8:
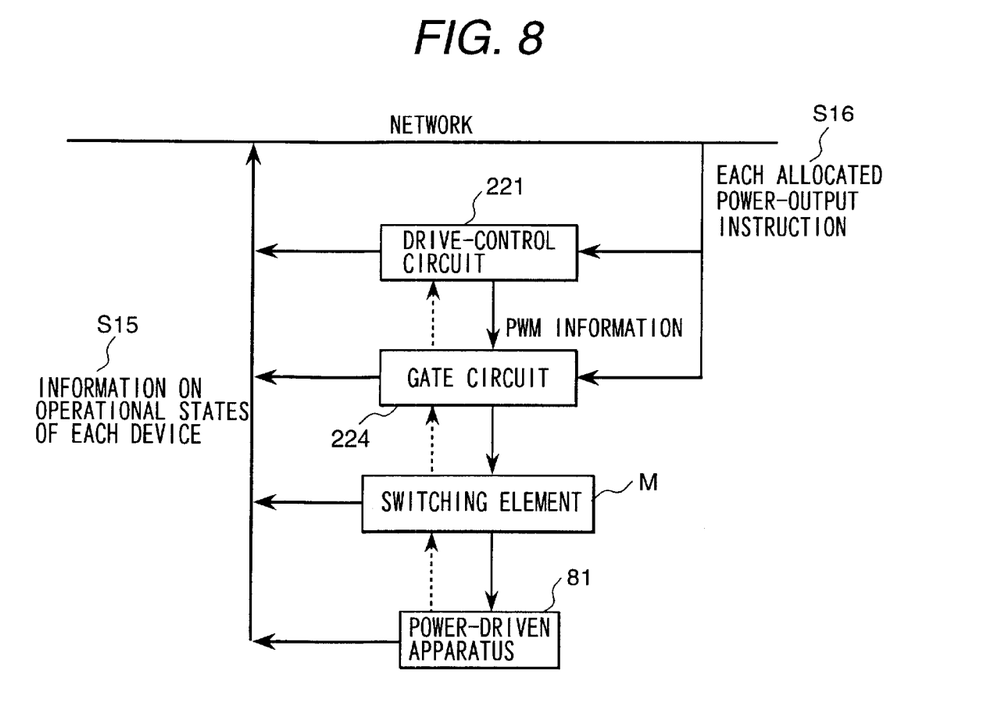
FIG. 8 is a schematic block diagram showing the composition of each drive device.

FIG. 8 shows the composition of each drive device shown in FIG. 5 and FIG. 6 in more detail. Each drive device includes a drive-control circuit 221, a gate circuit 224, a switching element M, and a power-driven apparatus 81. The allocated power-output instructions S16 are transmitted to the drive-control circuit 221 the gate circuit 224 via the networks. On the other hand, the information on operational state of each device is output from the drive-control circuit 221, the gate circuit 224, the switching element M, and the power-driven apparatus 81, via the networks. Further, it is possible that an operator always monitor each device by lumping and displaying the operational information of all devices such as the controlled-variables of the respective devices, etc. Further, it is also possible that the running states of the railway vehicle are transmitted to an external facility, and are monitored by the external facility. By providing the above described monitoring function in the external facility, a highly reliable railway vehicle system can be provided.

A PWM (Pulse With Modulation) signal is sent to the drive-control circuit so that each device can output power in response to the allocated power-output instruction S16. The gate circuit 224 sends a gate signal to the switching element M based on the PWM signal in order to turn on/off the switching element M. When current flows in the switching element M, this element is in an ON state, and vice versa. By this ON/Off operation of the switching element M, the intermittent voltage is applied to the drive device 81, by which the power output from each drive device is controlled.

The temperature, flowing current, the voltage, etc., of the switching element M are detected, and the detected data are transmitted to the central processing unit S13 via the gate circuit 224 or the networks. There are several kinds of compositions of detection systems for detecting the temperature, the current, the voltage, of the switching element M. For example, in one method, a detection part and a read-out part are provided together at the switching element M. In another method, the detection part is provided at the switching element M, and the read-out part is provided at the gate circuit 224. Also, the read-out part can be provided at the drive-control circuit 221. At the gate circuit 224, information on the voltage of a power source of the gate circuit 224, the output voltage of the gate circuit 224, etc., is read out. At the drive-control circuit 221, current flowing in the power-driven apparatus 81, the voltage applied and the current input to the switching element M, etc., are state variables to be detected.

Figure 9:
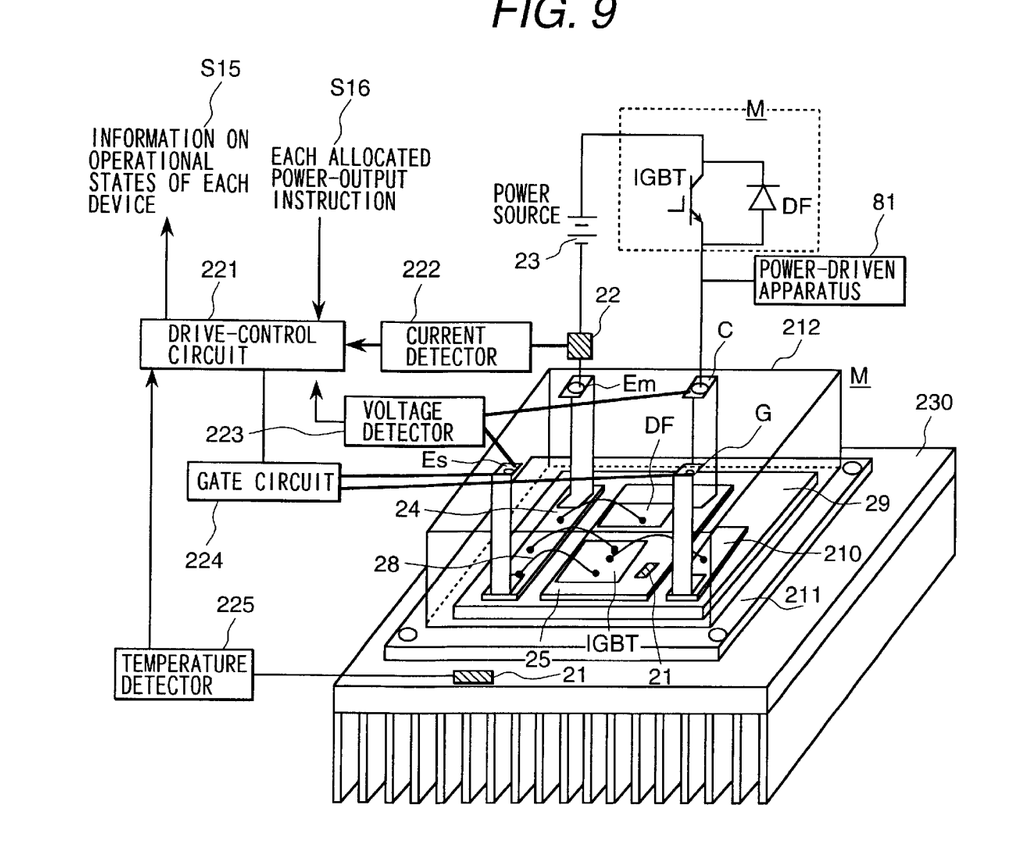
FIG. 9 is a diagram showing the detailed composition of each drive device.
Figure 10:
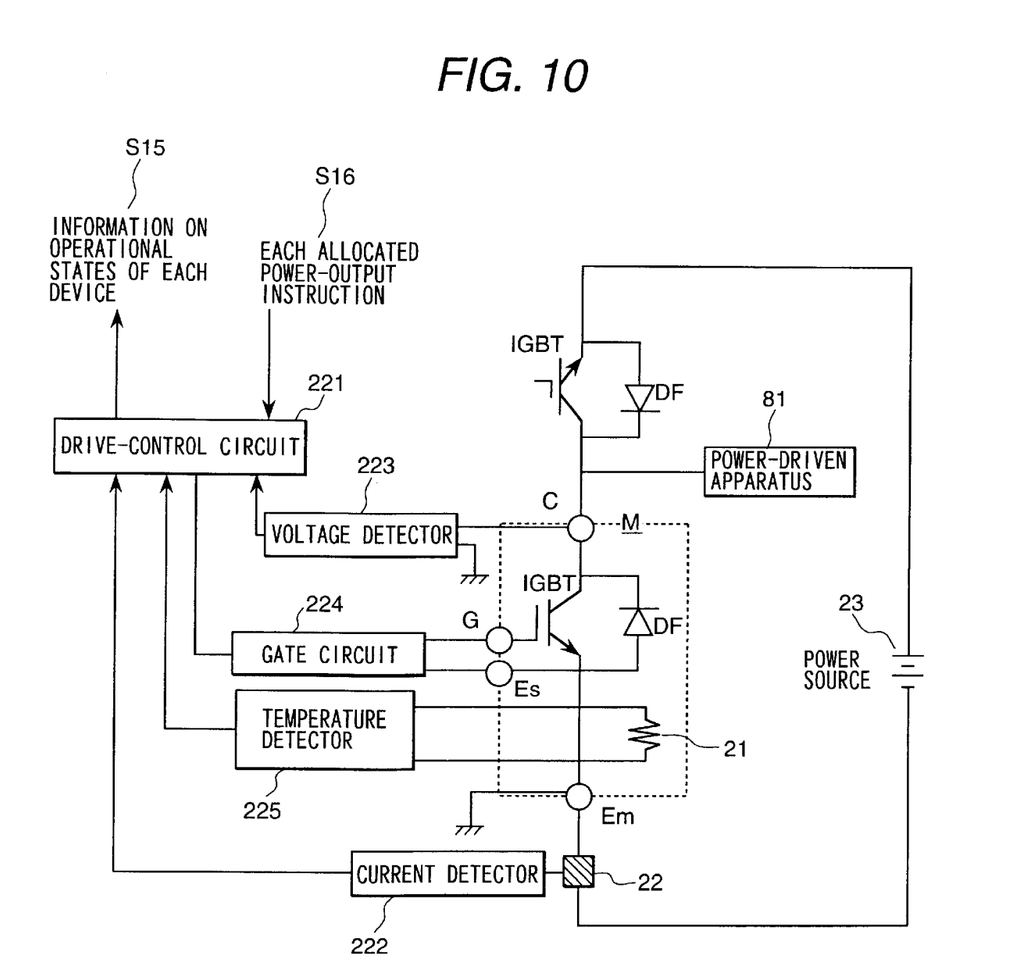
FIG. 10 is an illustration showing the schematic circuit composition, and explaining the principle for reducing the switching loss.

FIG. 9 shows the structural composition of the drive-circuit 8s, and it is explained with reference to FIG. 8, in more detail, and FIG. 10 is a diagram of the equivalent circuit of the composition shown in FIG. 9. The structure of the switching element M is explained below. An insulation plate 29 is provided on a metal heat sink plate 211, and a metal plate 25 is provided on the metal heat sink plate 211. An IGBT chip and a diode chip DF are mounted on the metal plate 35. A collector electrode of the IGBT chip and the cathode electrode of the diode chip DF are connected to a collector terminal C via the metal plate 25.

Further, by wiring 28, an emitter electrode of the IGBT chip and the anode electrode of the diode chip DF are connected to a collector terminal Em via an emitter electrode plate 24. An emitter terminal Es provided for sensors is connected to an emitter terminal plate 24. Main current flows through the emitter terminal Em. The emitter terminal Es is used to pass current for controlling the gate of the IGBT, and the main current does not usually pass through this emitter terminal Es.

A gate terminal G is connected to a gate electrode of the IGBT via a gate electrode plate 210. The above-described composition of the drive device is contained in a plastic package 212, and each terminal is led out from the plastic package. Further, the switching element M is fixed on a cooling device 230 which has an excellent heat dissipation ability. The temperature sensor 21 is attached at the cooling device 230 or the metal plate 25 to which the switching element is mounted.

Further, a DC power source 23 and the switching element M are serially connected between the collector terminal C and the emitter terminal Em of the switching element M. The current sensor 22 and a current detector are provided between the emitter terminal Em, and the temperature sensor 22 is connected the temperature detector 222 which are provided between the collector terminal C and the emitter terminal Em.

Output signals of the current detector 222, the voltage detector 223, the temperature detector 225, are connected to the drive-control circuit 221. It is possible to connect signals output from; the current detector 222, the voltage detector 223, the temperature detector 225; to the gate circuit 224, and to connect these signals to the drive-control circuit 221.

Further, the gate circuit 224 is connected to the emitter terminal Es provided for the sensors and the gate terminal G, and the gate circuit 224 is connected to the drive-control circuit 221. Furthermore, drive-control circuit 221 transmits the information S15 on operational state of each device and the allocated power-output instruction to each device via the networks.

Although it is desirable to provide the temperature sensor 21 near the IGBT, it is possible to mount the temperature sensor 21 on a heat sink 230. The permissible maximal temperature is usually set to 125° C. This permissible level is one of the lowest temperature levels to which usual element structure devices are set. The monitoring of the temperature of the IGBT chip aims at monitoring the temperature of the switching element M. If the temperature sensor 21 is mounted on the heat sink 230, the temperature of the IGBT is sensed via four contact faces, that is: a contact face of the IGBT and the metal plate, a contact face of the metal plate 25 and the insulation plate 29, a contact face of the insulation plate 29 and the heat sink plate 211, and a contact face of the heat sink plate 211 and the cooling device 230.

Therefore, errors in estimating the temperature of parts which composes the IGBT, become large. Moreover, there is another method in which a temperature sensor made of polysilicon is formed on the IGBT chip. This method is a best one for highly accurately detecting the IGBT chip.

FIG. 10 shows an equivalent circuit of the structure shown in FIG. 9, and its explanation is omitted.

Figure 11A:
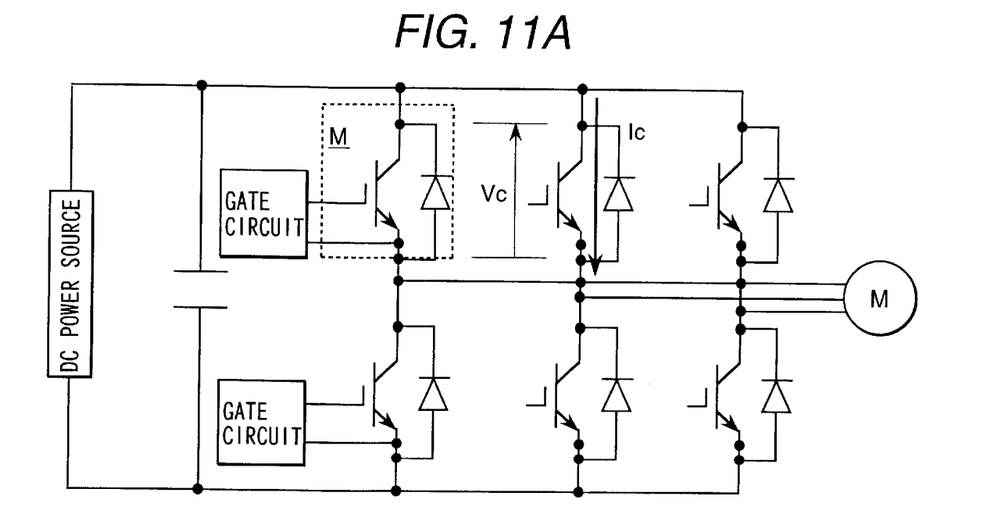
FIG. 11A is a schematic diagram of an inverter motor.

In accordance with the present invention, the loss of the switching element can be reduced. In the following, the reason of the loss-reduction will be explained. FIG. 11A shows the main composition, and each switching element M implements ON/OFF operations so as to control the power-driven apparatus 81, which is an motor in this embodiment. The gate terminal G of the switching element M, and the emitter terminal Es, are connected to a control circuit. Two pairs of the gate terminals G of the switching elements M of and the emitter terminals Es provided for the sensors are serially connected, and compose one phase-circuit of a three-phase inverter. Moreover, three phase-circuits are connected in parallel so as to compose the three phase inverter. Both the terminals of each phase-circuit which is composed by serially connecting two switching elements M, are connected to a DC power source. The central connection point of each phase-circuit in which two switching elements M are serially connected, is connected to the three-phase induction motor. The gate circuit is further connected to an upper rank control circuit.

Figure 11B:
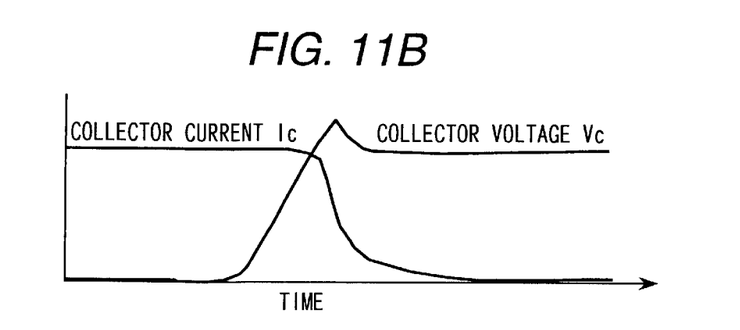
FIG. 11B is a time chart of changes in the collector voltage and the collector current of a switching element in the inverter shown in FIG. 11A.

The switching operation of the switching element M in this circuit causes loss. FIG. 11B shows a principle of the loss generation, which indicates changes of current and the voltage when the switching element turns off. When the current flowing in the switching element, there is some period, for which the current flows while decreasing, and the voltage increases. Accordingly, the product of the current and the voltage, that is, the loss is caused. The loss is caused every switching operation. Therefore, the switching loss increases proportional to the switching frequency. FIG. 11D shows the relationship between the switching loss and the switching frequency.

Figure 11C:
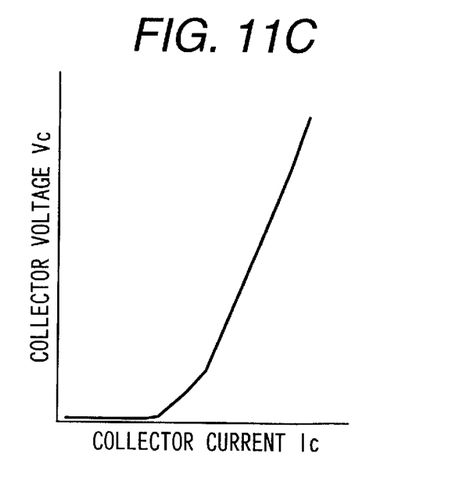
FIG. 11C is a graph showing the relationship between the collector voltage and the collector current.
Figure 11D:
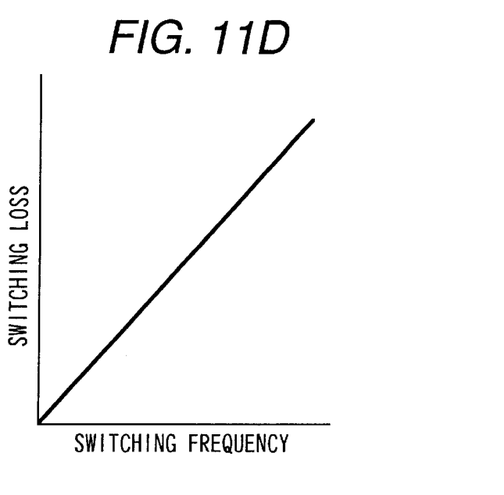
FIG. 11D is a graph showing the relationship between the switching frequency and the switching loss.

FIG. 11C shows the output characteristics of the switching element and the relationship between the collector voltage Vc and the collector current Ic. When the collector current Ic flows, since the collector voltage Vc generates, the loss is caused.

As apparently seen from FIG. 11C and FIG. D, the loss changes depending on the amount of the current flowing in the switching element and the switching frequency. By using the above phenomena, it is known that the step S211 and S26 can be implemented. That is, if the collector current Ic is reduced, the output of the inverter is also reduced. If only the frequency is reduced, the loss can be decreases without reduction of the output power. Therefore, the step S211 can be achieved at least by decreasing the switching frequency. Also, it is possible to reduce the loss without reduction of the output power by rapidly changing the collector voltage Vc and current Ic in the switching operations.

It is clearly shown in FIG. 11C that the step S26 of the instruction of lowering the total power-output is achieved by decreasing the collector current.

Figure 12:
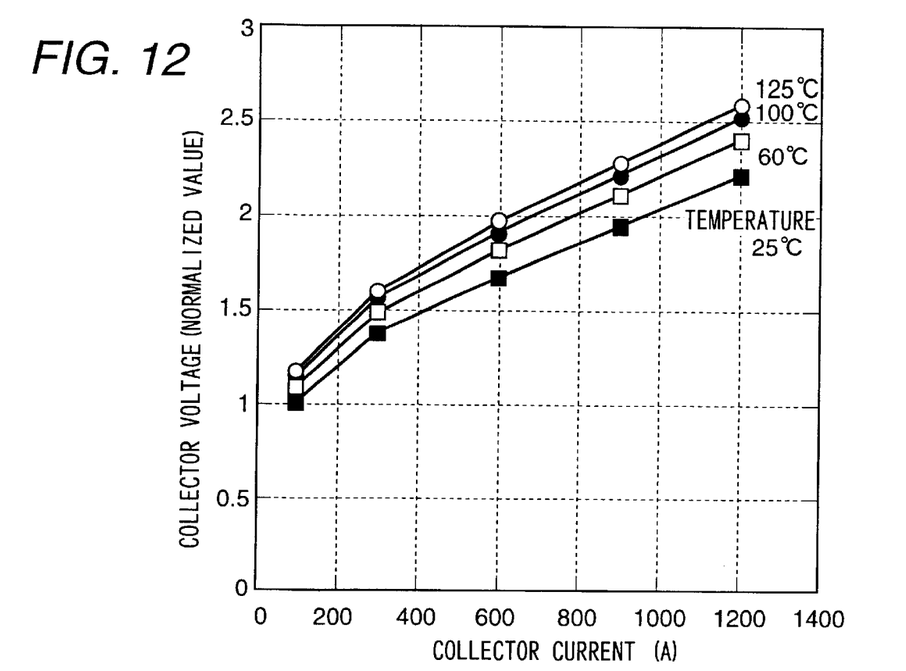
FIG. 12 is a graph showing the dependency of the switching loss on the collector current.
Figure 13:
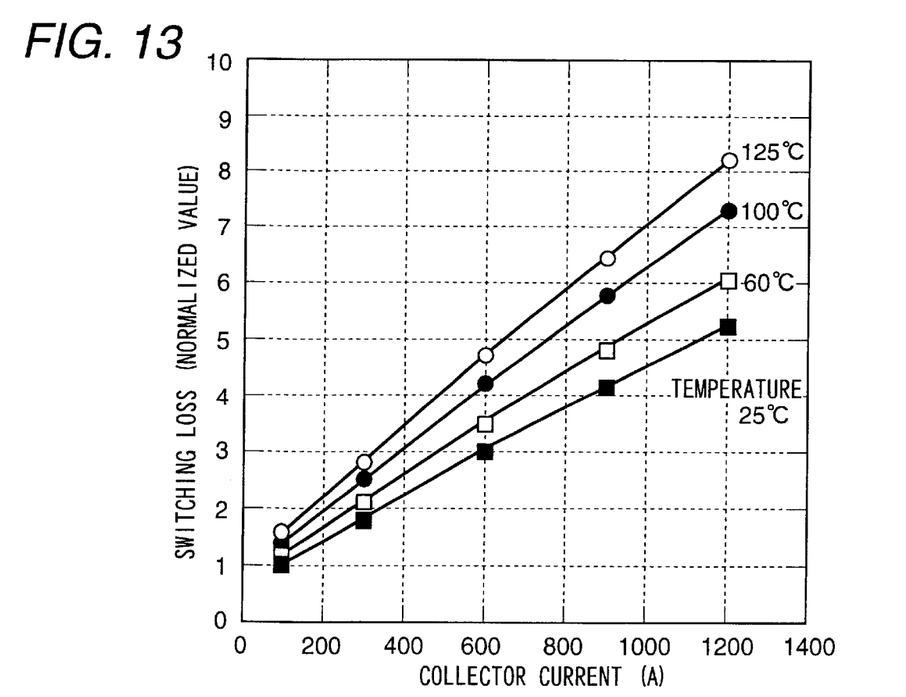
FIG. 13 is a graph showing the measured dependency of the switching loss on the collector current.

FIG. 12 shows the relationship between the measured collector voltage and current at several temperature points of the inverter. Meanwhile, the collector current is normalized by the collector voltage at the temperature of 25° C. and the collector current of 100A for easily understanding the tendency. Further, FIG. 13 shows the relationship between the measured switching loss and current at several temperature points of the inverter. Meanwhile, the switching loss is normalized by the collector voltage at the temperature of 25° C. and the collector current of 100A. Here, the withstand voltage and the rated current of the switching which was measured, is 3.3 kV and 1200A, respectively. The collector voltage becomes higher, as the collector current is larger and the temperature is higher. Concerning the loss, this tendency is the same.

Therefore, it is seen from FIG. 13 that the loss of the switching element is lower as the switching element is operated at a lower temperature. In the vehicle such as a railway vehicle, since a plurality of inverters are operated in parallel, the temperature of all the inverters hardly become equal. By decreasing the power-output of the inverter whose temperature increases, the decreased power-output is allocated to the inverters whose temperature values are not so high.

The Kernel part of the above-described control method can also be applied to a transport system or an apparatus, which includes a plurality of drive devices other than a railway vehicle, such as an air plane.

As mentioned above, in an apparatus which achieves a function by coordinating a plurality of devices, by continuously monitoring operational states, and keeping the states of the respective device uniform, the high performance of the operation can be kept without deteriorating the function of the whole apparatus.

The higher loss is caused by a higher temperature state of an inverter. By suppressing th power-output of an inverter whose temperature is high, and allocating the reduced power-output of the inverter to the other inverters whose temperature levels are not so high. Further, by monitoring an occurrence of idle-running of each drive device, and the power-output of a device at which idle running has occurred, is reduced. Further, by allocating the reduced power-output to the other drive devices at which idle-running does not occur, it is possible to provide a railway vehicle whose total acceleration performance is not degraded.

What is claimed is:

1. A railway vehicle operation-control system including at least one central processing unit connected to a plurality of devices, which are connected in parallel, via information communication means; said plurality of said devices having at least one operational state-monitoring function which transmits information on an operational state of each device to said the central processing unit;

wherein a total controlled-variable necessary for said system is attained by substantially equally allocating said total control variable to said respective devices based on operational states determined from results of monitoring performed by said their operational state-monitoring functions, and a performance margin which is defined as a difference between a permissible power-output value and a current power-output value for each device; so that it is possible to implement said allocating of said total control variable to each device while monitoring and reflecting said performance margin of each device.

2. A railway vehicle operation-control system according to claim 1, further including at least one vehicle position-detector, and at least one memory which is connected to said information communication means, and in which, for a predetermined route; a total controlled-variable necessary for said system, and a standard allocated controlled-variable pattern for said respective devices, are stored at each position detected by said vehicle position-detector, for said railway vehicle;

wherein said standard allocated controlled-variable pattern is adjusted based on an monitored actual performance margin of each device.

3. A railway vehicle operation-control system according to claim 2, wherein said total controlled-variable necessary for said system is allocated to said respective devices so that said substantially equally allocated performance margins of said respective drive device change in a predetermined dispersion range.

4. A railway vehicle operation-control system according to claim 1, wherein a standard allocate controlled-variable pattern for a running interval from the detected current position to the next stop position is read out from said memory; said standard allocate controlled-variable pattern is adjusted in advance by considering the present running environment and assumed changes of said performance margins of said respective devices; and a controlled-variable of each device is controlled to achieve the objective of running for said interval while adjusting said adjusted allocated controlled-variable pattern of said respective devices.

5. A railway vehicle operation-control system according to claim 4, wherein said total controlled-variable necessary for said system is allocated to said respective devices so that said substantially equally allocated performance margins of said respective drive device change in a predetermined dispersion range.

6. A railway vehicle operation-control system according to claim 1, wherein said total controlled-variable necessary for said system is allocated to said respective devices so that said substantially equally allocated performance margins of said respective drive device change in a predetermined dispersion range.

7. A railway vehicle operation-control system according to claim 1, wherein one of items to be monitored at said devices is the temperature.

8. A railway vehicle operation-control system according to claim 1, wherein one of items to be monitored at said devices is an idle running state of each wheel.

9. A railway vehicle operation-control system according to claim 1, wherein at least one of said drive device is a power conversion apparatus.

10. A railway vehicle operation-control system according to claim 1, wherein, if an anomalous device is detected said devices, the allocated controlled variable of said anomalous device is reduced, or is disconnected from this control system, and an controlled-variable which said anomalous device is reduced or has charge of, is distributed to the rest devices other than said anomalous device so that changes in said performance margins of said rest devices are in a predetermined dispersion range, and current values of said operational states of said respective device do not exceed their predetermined permissible levels.

11. A railway vehicle operation-control system according to claim 1, wherein current operational states and performance margins of said respective devices are continuously displayed and monitored in the block at an operation control room.

12. A railway vehicle including at least one central processing unit connected to a plurality of drive devices, which are connected in parallel, via information communication means, said plurality of said drive devices having at least one operational state-monitoring function which transmits information on an operational state of each device to said the central processing unit;

wherein said total controlled-variable necessary for said railway vehicle is substantially equal allocated to said respective drive devices so that said substantially equally allocated performance margins of said respective drive device change in a predetermined dispersion range.

13. A railway vehicle according to claim 12, further including at least one vehicle position-detector, and at least one memory which is connected to said information communication means, and in which, for a predetermined route, a total controlled-variable necessary for said railway vehicle, and a standard allocated controlled-variable pattern for said respective drive devices, are stored at each position detected by said vehicle position-detector, for said vehicle;

wherein said standard allocated controlled-variable pattern is adjusted based on an monitored actual performance margin of each drove device.

14. A railway vehicle according to claim 13, wherein said total controlled-variable necessary for said railway vehicle is allocated to said respective drive devices so that changes in said performance margins of said respective drive device are in a predetermined dispersion range, and a current value of a monitored operational state of each drive device does not exceed a predetermined permissible level.

15. A railway vehicle according to claim 12, wherein a standard allocate controlled-variable pattern for a running interval from the detected current position to the next stop position is read out from said memory; said standard allocate controlled-variable pattern is adjusted in advance by considering the present running environment and assumed changes of a performance margin; and a controlled-variable of each drive device is controlled to achieve the objective of running for said interval by using this adjusted allocated controlled-variable pattern.

16. A railway vehicle according to claim 15, wherein said total controlled-variable necessary for said railway vehicle is allocated to said respective drive devices so that changes in said performance margins of said respective drive device are in a predetermined dispersion range, and a current value of a monitored operational state of each drive device does not exceed a predetermined permissible level.

17. A railway vehicle according to claim 12, wherein said total controlled-variable necessary for said railway vehicle is allocated to said respective drive devices so that changes in said performance margins of said respective drive device are in a predetermined dispersion range, and a current value of a monitored operational state of each drive device does not exceed a predetermined permissible level.

18. A railway vehicle according to claim 12, wherein one of items to be monitored at said drive devices is the temperature.

19. A railway vehicle according to claim 12, wherein one of items to be monitored at said drive devices is an idle running state of wheels.

20. A railway vehicle according to claim 12, wherein at least one of said drive device is a power conversion apparatus.

21. A railway vehicle according to claim 12, wherein, if an anomalous drive device is detected in said drive devices, the allocated controlled variable of said anomalous device is reduced, or is disconnected from this railway vehicle, and an controlled-variable which said anomalous drive device is reduced or has charge of, is distributed to the other drive device so that changes in said performance margins of said rest drive devices are in a predetermined dispersion range, and said current operational states of said respective drive device do not exceed their predetermined permissible levels.

22. A railway vehicle operation-control system according to claim 12, wherein current operational states and performance margins of said respective drive devices are continuously displayed and monitored in the block at an operation control room.

23. A railway vehicle operation-control system according to claim 12, further a communication unit for transmitting current operational states and performance margins of said respective drive devices to an external running facility.

* * * * *